US011982350B2

(12) United States Patent
Stoehr et al.

(10) Patent No.: US 11,982,350 B2
(45) Date of Patent: May 14, 2024

(54) LOCKING ACTUATOR, BRAKE TRANSMISSION WITH SUCH A LOCKING ACTUATOR AND SERVICE AND/OR PARKING BRAKE

(71) Applicant: IMS GEAR SE & CO. KGAA, Donaueschingen (DE)

(72) Inventors: Johannes Stoehr, Villingen-Schwenningen (DE); Fabian Gruler, Aixheim (DE); Wilfried Synovzik, Huefingen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 101 days.

(21) Appl. No.: 17/711,663

(22) Filed: Apr. 1, 2022

(65) Prior Publication Data

US 2022/0325796 A1    Oct. 13, 2022

(30) Foreign Application Priority Data

Apr. 9, 2021 (EP) .................................... 21167642

(51) Int. Cl.
  *F16H 63/34* (2006.01)
  *B60T 1/00* (2006.01)
  *F16D 63/00* (2006.01)

(52) U.S. Cl.
  CPC .......... *F16H 63/3458* (2013.01); *B60T 1/005* (2013.01); *F16D 63/006* (2013.01); *F16H 63/3433* (2013.01)

(58) Field of Classification Search
  CPC ........ F16D 63/006; F16D 65/14–65/22; F16D 2121/24; F16D 2125/20; F16D 2125/22;
  (Continued)

(56) References Cited

U.S. PATENT DOCUMENTS

2005/0217952 A1* 10/2005 Usui ...................... F16D 65/18
                                                                188/162
2018/0135710 A1*  5/2018 Sala ..................... B60T 13/741
(Continued)

FOREIGN PATENT DOCUMENTS

CN          102720834 A       10/2012
DE      102017127211 A1        5/2018
(Continued)

OTHER PUBLICATIONS

European Search Report issued Oct. 21, 2022, in corresponding EP application No. 21167642.4.
(Continued)

*Primary Examiner* — Richard M Lorence
(74) *Attorney, Agent, or Firm* — Nath, Goldberg & Meyer; Jerald L. Meyer; Morgan D. Rosenberg

(57) ABSTRACT

The present invention relates to a locking actuator (2) for a brake transmission (1), in particular for a brake transmission (1) of an electric parking and/or service brake, having a driving device (5), a housing (10), a transmission (20) with an axis of rotation (R) and an output (24), and a ratchet slide (30), which is movable in an axis (L) between a first position and a second position along a locking path, wherein the output (24) is coupled to the ratchet slide (30) via an eccentric (25) and can move the ratchet slide (30) in the axis (L) when the output (24) is rotated. In addition, the present invention relates to a brake transmission (1) and an operating and/or parking brake.

19 Claims, 6 Drawing Sheets

(58) Field of Classification Search
CPC ............. F16D 2127/06; F16D 2129/00; F16D 2129/10; B60T 1/005; B60T 13/74; B60T 13/741; B60T 13/746; F16H 63/3433; F16H 63/3458
See application file for complete search history.

(56) References Cited

U.S. PATENT DOCUMENTS

| | | |
|---|---|---|
| 2018/0154881 A1 | 6/2018 | Heubner et al. |
| 2019/0277401 A1 | 9/2019 | Nofzinger et al. |
| 2020/0200270 A1 | 6/2020 | Lenke et al. |

FOREIGN PATENT DOCUMENTS

| | | |
|---|---|---|
| DE | 102017127212 A1 | 5/2018 |
| DE | 102017127214 A1 | 5/2018 |
| EP | 3333463 A1 | 6/2018 |
| JP | 2016070288 A2 | 5/2016 |
| WO | 2016/174587 A1 | 11/2016 |
| WO | 2016174587 A1 | 11/2016 |

OTHER PUBLICATIONS

Office action issued on Sep. 30, 2023, parallel pending Chinese patent application No. 2022 1026 9285.3.

* cited by examiner

LOCKING ACTUATOR, BRAKE TRANSMISSION WITH SUCH A LOCKING ACTUATOR AND SERVICE AND/OR PARKING BRAKE

The present invention relates to a locking actuator for fixing a ratchet wheel, a brake transmission with such a locking actuator and a service and/or parking brake.

Locking actuators are known from prior art in different configurations. The locking actuators known from the prior art are used for the mechanical locking of shafts or transmission parts and are used in the prior art for a large number of applications. Generic locking actuators are widely used, for example, for electronic parking brakes and are used whenever a vehicle with the brake applied is to be parked for a longer period of time.

Such parking brakes are also known as electric parking brakes (EPB) and typically include a caliper and a motor, the motor being actuated to apply the brake. Electric parking brakes are widely used in motor vehicles together with conventional hydraulic service brakes in a braking system.

In order to ensure that the parking brakes brake the motor vehicle sufficiently at all times, dry parking brakes in particular must be tightened when the vehicle is stationary, in order to provide a sufficiently high braking force even when the components involved have cooled down so that the motor vehicle remains in its position.

Such braking systems have proven themselves in the past, but it has been shown that the locking actuators used have proven to be unreliable and prone to errors on the one hand and have high response times on the other, as a result of which, in particular, the releasing of the parking brake for continuing the journey is delayed.

In addition, there is a desire on the part of the automotive industry to use "dry" electric service brakes in motor vehicles in order, on the one hand, to achieve weight savings and, on the other hand, to reduce the complexity of the braking systems.

This is where the present invention begins.

The object of the present invention is to provide a locking actuator, in particular a locking actuator for a brake transmission of an electric service brake, which expediently eliminates the disadvantages known from the prior art. The locking actuator should enable a quick change between the operating modes of a service brake between driving operation and parking operation and, on the other hand, be able to reliably lock the brake transmission of the brake during parking operation.

These objects are achieved by a locking actuator with the features of claim 1, a brake transmission with the features of claim 18 and a service brake of a motor vehicle with the features of claim 19.

Further advantageous embodiments of the present invention are specified in the dependent claims.

The locking actuator according to the invention with the features of claim 1 has a driving device, a housing, and a transmission driven by the driving device with an output. In addition, the locking actuator has a ratchet slide, which is movable in an axis between a first position and a second position along a locking path. According to the invention, the output is coupled to the ratchet slide via an eccentric in such a way that the ratchet slide can be moved in the axis when the output is rotated.

The present invention is based on the idea of providing a compact locking actuator which uses a transmission to actuate the ratchet slide. On the drive side, the transmission is driven by the driving device and, on the output side, the transmission is in operative connection via the output by means of the eccentric with the ratchet slide, which means that the ratchet slide can be moved in the axis. The eccentric is arranged on the carrier eccentrically with respect to the axis of rotation of the transmission; it is already noted at this point that the eccentric can be fastened to the output or can be formed integrally with the output.

The ratchet slide according to the present invention can act as a detent or a pawl or comprise a detent or a pawl, and is configured to cooperate with a ratchet wheel, which is described in detail later. The first position of the ratchet slide can correspond to the released state of the ratchet wheel, the ratchet slide not entering or meshing with the ratchet wheel or its teeth and said wheel being freely movable in both directions of rotation.

The second position of the ratchet slide can correspond to the locked state of the ratchet wheel, wherein the ratchet wheel is preferably locked in one of the two directions of rotation and turns freely in the other of the two directions of rotation. In this second position, the ratchet slide can protrude into the ratchet wheel or the teeth thereof and block said wheel in at least one of the two directions of rotation.

According to an advantageous development of the present invention, the eccentric engages a guide recess of the ratchet slide. The eccentric is thus in operative contact with the guide recess in at least one of the Cartesian spatial directions, wherein the guide recess enables the eccentric to be deflected in a direction—preferably a single direction—transverse to the axis.

According to a further advantageous embodiment of the present invention, the eccentric is held in a movable manner within the guide recess in a plane transverse to the axis of rotation. Accordingly, the guide recess is dimensioned both in the direction of the axis and transversely to the axis in such a way that the eccentric is movable within the guide recess. In particular, it is advantageous if the eccentric can only come into operative contact with a contact surface of the guide recess, wherein even more preferably the contact surface of the guide recess is located on a side facing away from the pawl.

The guide recess should enable an evasive movement of the ratchet slide, which movement allows the ratchet wheel to turn freely.

For this purpose, the ratchet wheel can preferably have teeth with flat and steep flanks, wherein the ratchet slide can slide over the flat flank while making the evasive movement, while, during a rotation in the opposite direction of the ratchet slide, it hits the steep flank, produces a form fit with the same and blocks the rotation.

According to a further development of the present invention, the guide recess in the axis is dimensioned in such a way that a displacement of the eccentric is possible within the guide recess and within the order of magnitude of the locking path. Dimensioning within the order of magnitude of the locking path is to be understood as a measure which preferably corresponds to the tooth height of the ratchet wheel and is less than or equal to the locking path. The measure can preferably be about 75-100% of the locking path. The guide recess enables the ratchet slide to move evasively in order to enable the ratchet wheel to turn freely.

According to a further advantageous embodiment of the present invention, the guide recess of the ratchet slide has a gate which cooperates with the eccentric. The gate forms the contact surface of the guide recess. During a rotation of the eccentric, the eccentric rolls on the gate, the gate having a nonlinear shape, preferably a wave shape, whereby the displacement of the ratchet slide in addition to the rotational movement of the eccentric depends on the design of the shape of the gate.

According to a preferred embodiment of the present invention, the gate of the guide recess comprises a protrusion, by means of which the ratchet slide is initially moved in the opposite direction along the locking path between the first position and the second position. It is also preferable that the gate has a final position section next to the protrusion. Against increased resistance, the eccentric can be pushed over the protrusion, as a result of which a locking means is formed, which prevents the eccentric from unintentionally leaving the first final position and/or the second final position.

Furthermore, it has proven to be advantageous if the ratchet slide is biased into the first position or the second position by spring means. The spring means preferably bias the ratchet slide into the second, i.e. locking, position. Preferably, the eccentric determines the maximum deflection of the ratchet slide in the direction of the second position and the spring means acts in the direction opposite from the eccentric.

It has proven to be advantageous if the transmission comprises a planetary gearset and/or a cycloidal drive.

Preferably, the planetary gearset and/or the cycloidal drive comprises a ring gear, the ring gear preferably having internal teeth.

In addition, it has proven to be advantageous if the transmission has a drive gear and at least one planet gear which is coupled to the output via a carrier that can be rotated about the axis of rotation. The drive gear is preferably driven by the driving device and is in operative contact with the at least one planet gear, the planet gear in turn being in operative connection with the ring gear.

The planet gear of the cycloidal drive is driven by the drive gear by means of an eccentric and rolls on the ring gear in an orbital motion around the axis of rotation. The rotary or orbital movement of the planet gear is transmitted to the output via a carrier which has one or more pins, which reach into recesses of the planet gear in a known manner.

The planetary gearset preferably has a plurality of planet gears, also called planet wheels, which are rotatably arranged on a common planet carrier. The planet carrier is rotatable around the axis of rotation and forms the output.

In accordance with a further development of the present invention, the ring gear is fixed in the housing and the driving device drives the drive gear of the planetary gearset or of the cycloidal drive. Both the drive gear and/or the ring gear can be preferably arranged coaxially with respect to the axis of rotation and the at least one planet gear rotates together with the carrier about the axis of rotation. The rotation of the carrier corresponds to the output of the planetary gearset and dictates the motion of the eccentric in an orbit around the axis of rotation.

In accordance with a further development of the present invention, the ratchet slide is movably held by a guide in the axis perpendicular to the axis of rotation. The guide forms a forced guide of the ratchet slide and is configured to absorb forces transversely to the axis, which can result, for example, when the ratchet wheel is locked.

Preferably, the guide of the ratchet slide is a recess in the housing, wherein, in addition, according to a further development, a second housing part can be provided, which holds the ratchet slide in the recess of the housing in a form-fitting manner. Furthermore, it is advantageous if the second housing part forms a bearing for the carrier. Further housing parts can be provided which, for example, receive the driving device and/or housing parts in whole or in part.

According to a further development of the present invention, at least one end stop is provided, which restricts a rotation of the carrier about the axis of rotation. Preferably, two end stops restrict a rotation of the carrier by approximately 180°. The end stops indicate the position of the eccentric in a final position and specify the position of the ratchet slide.

According to a further development of the present invention, at least one sensor is provided, which can detect the position of the ratchet slide, of the carrier and/or of the eccentric. The sensor can thus clearly detect the state of the locking actuator.

The driving device can include a DC motor. The DC motor can be supplied with voltage by a DC voltage source, in particular a power storage device of a motor vehicle.

A further aspect of the present invention relates to a brake transmission with an above-described locking actuator and a rotatable ratchet wheel.

The ratchet wheel is preferably arranged to be rotatable in a transmission axle, wherein the transmission axle is even more preferably parallel to the axis of rotation of the transmission of the locking actuator.

Furthermore, it is advantageous if the housing of the locking actuator also forms a transmission housing of the brake transmission.

It has also proven to be advantageous if the ratchet wheel has a plurality of teeth, each tooth being formed from a flat flank and a steep flank.

A further aspect of the present invention relates to a brake, in particular an electrical service and/or parking brake with a previously described transmission.

Two exemplary embodiments are described in detail below with reference to the accompanying drawings. In the drawings.

Identical or functionally identical components are identified below with the same reference symbols. For the sake of clarity, not all the same or functionally identical parts are provided with a reference number in the individual figures.

Figure 1:
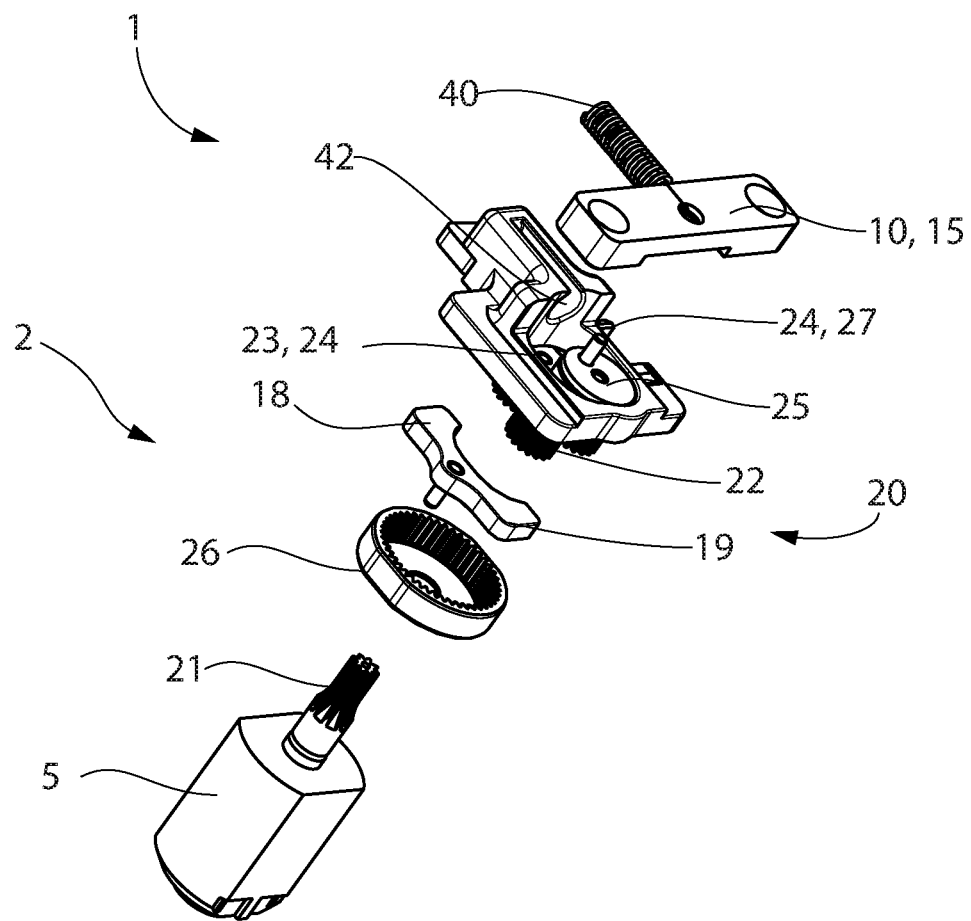
FIG. 1 is an exploded view of a locking actuator with a driving device, a housing, a transmission designed as a planetary gearset and a ratchet slide, which is movable between a first position and a second position.

FIG. 1 shows a perspective exploded view of a locking actuator 2 of a brake transmission 1 of an electric service brake according to a first exemplary embodiment, which comprises a driving device 5, a housing 10, a transmission 20 and a ratchet slide 30.

The driving device 5 can be a DC motor and is operationally connected to the planetary gearset 20.

The housing 10 can be formed from a plurality of housing parts 14, 14', 15 and 15', wherein the housing parts 14, 14', 15 and 15' are preferably produced from a plastic, preferably by injection molding. For illustration purposes, only a second housing part 15 is shown in FIGS. 1 to 7.

The housing 10 can also house the components of the (not fully illustrated) brake transmission 1, for example a ratchet wheel 50. The housing parts 14, 15 can be connected to one another, for example, by means of a screw connection. The housing parts 14' and 15' serve as housing covers.

According to this exemplary embodiment, the transmission 20 can be a planetary gearset that drives an output. The planetary gearset has an axis of rotation R, a drive gear 21, three planet gears 22, which are rotatably held on a carrier 23, and a ring gear 26, wherein the carrier 23 or the planet carrier is connected to the output. The drive gear 21 can form the sun gear and the planet gears 22 form the planets which are rotatably held by the planet carrier. The axis of rotation R is predetermined by the drive gear 21, wherein the drive gear 21 and the ring gear 26 are arranged concentrically. The carrier 23 is supported by means of a shaft 27 in a rotatable manner on the housing 10, preferably on the second housing part 15, wherein the carrier 23 or the shaft 27 is also rotatable in the axis of rotation R. Each planet gear 22 meshes both with the ring gear 26 and with the drive gear 21. The carrier 23 and the shaft 27 can form the output.

The drive gear 21 is driven by the driving device 5.

As can be seen in particular from the exploded view according to FIG. 1, an eccentric 25 is arranged on the carrier 23 and is arranged eccentrically with respect to the axis of rotation R, preferably on the side of the carrier 23 facing away from the planet gears 22.

Furthermore, it can be seen from FIGS. 4, 5, 8 and 9 that the carrier 23 does not have a rotationally symmetrical shape, but is designed in a pear-shaped manner with an oval-shaped abdominal section and a cuboid-like neck section. The neck section forms a stop surface 28a, 28b in both rotational directions around the axis of rotation R. It has proven to be advantageous if the stop surfaces 28a, 28b are V-shaped.

The eccentric 25 or the carrier 23 can be rotated back and forth between two final positions by approximately 180°, with stop surfaces 28a, 28b interacting in the final positions with end stops 18, 19 arranged on the housing 10. The figures in which the eccentric is in the first final position are marked with "A" and the figures in which the eccentric 25 is in the second final position are marked with "B".

Figure 9:
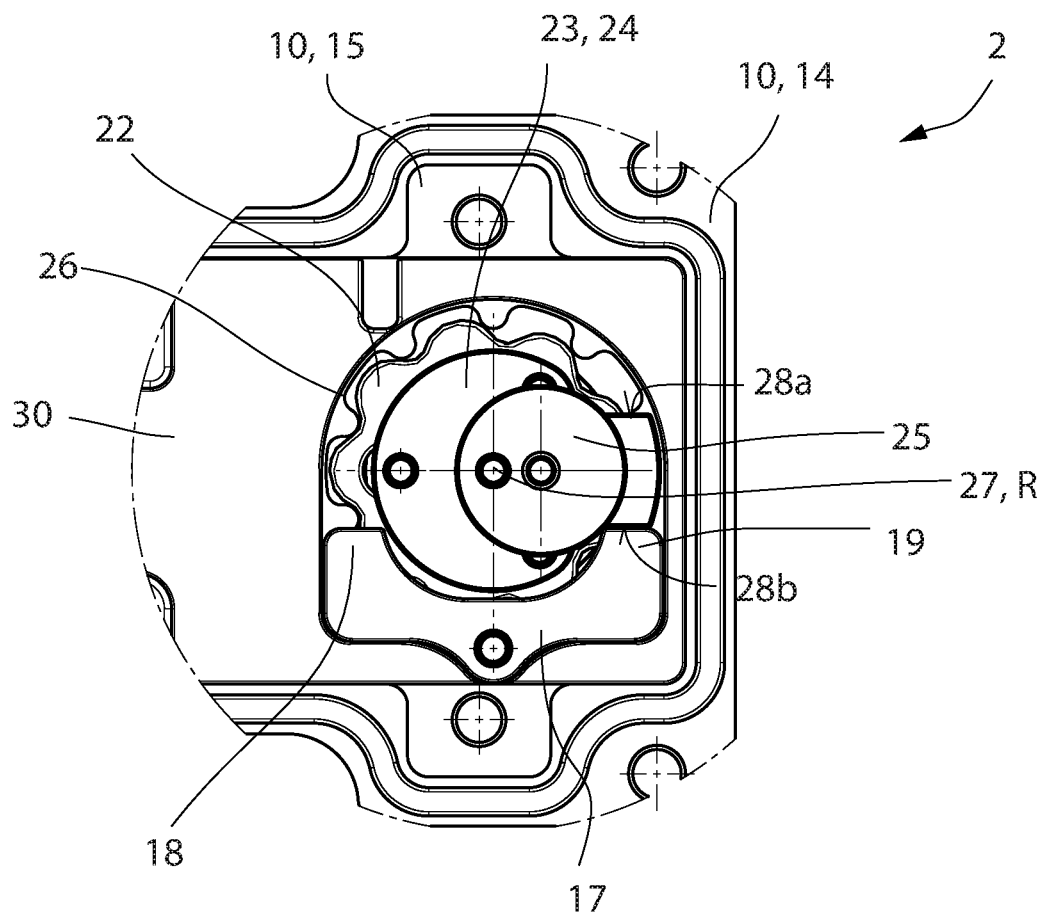
FIG. 9 shows an enlarged detailed representation of the locking actuator according to FIG. 8.

The end stops 18, 19—as shown in detail in FIG. 9—can be formed on a stop element 17, which is V-shaped and is supported on the housing 10 by means of a bolt centrally between the two end stops 18, 19.

Figure 2:
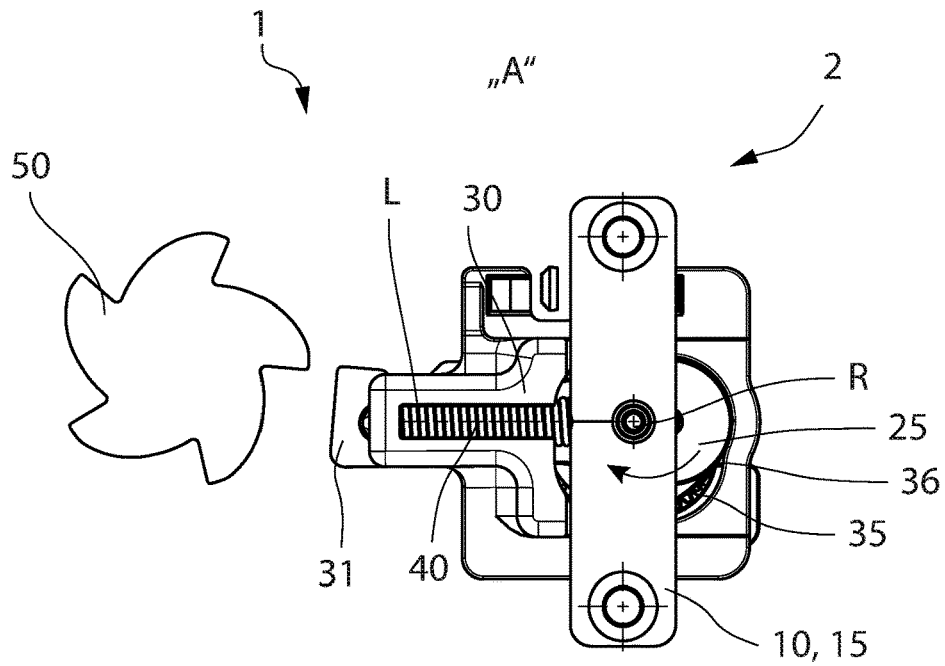
FIG. 2 shows the locking actuator according to FIG. 1 with a ratchet wheel of a brake transmission, wherein the ratchet slide is in the first position and the ratchet wheel is freely movable in both directions of rotation.

The ratchet slide 30 comprises a pawl 31 and is movable along an axis L, the axis L being arranged transversely to the axis of rotation R. The ratchet slide 30 is movable in the axis L between a first position and a second position along a locking path, wherein in the first position the pawl 31 is pulled out of the ratchet wheel 50—as shown in FIGS. 2 and 3—and in the second position it can engage the ratchet wheel 50.

The ratchet slide 30 can have approximately a rectangular shape and further has a first end area and a second end area, the first end area being located on the side facing away from the ratchet wheel 50, the second end area being located on the side facing the ratchet wheel 50 and the pawl 31 being located in the second end area.

Figure 3:
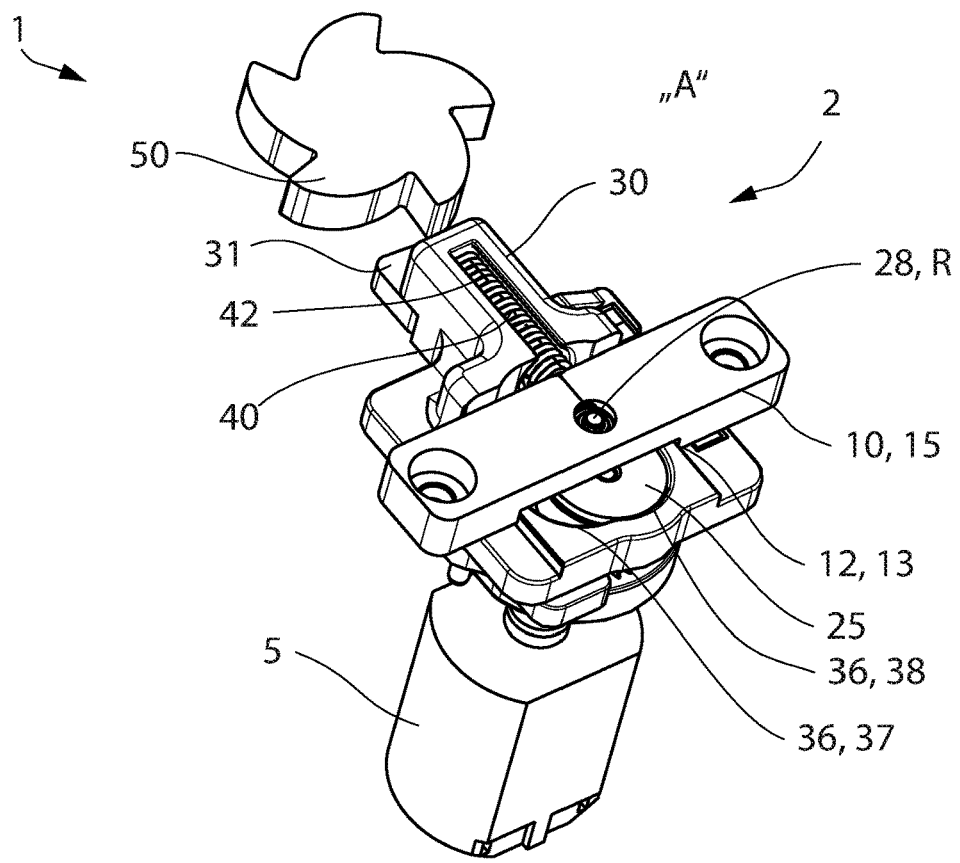
FIG. 3 shows a perspective representation of the locking actuator according to FIG. 2.
Figure 4:
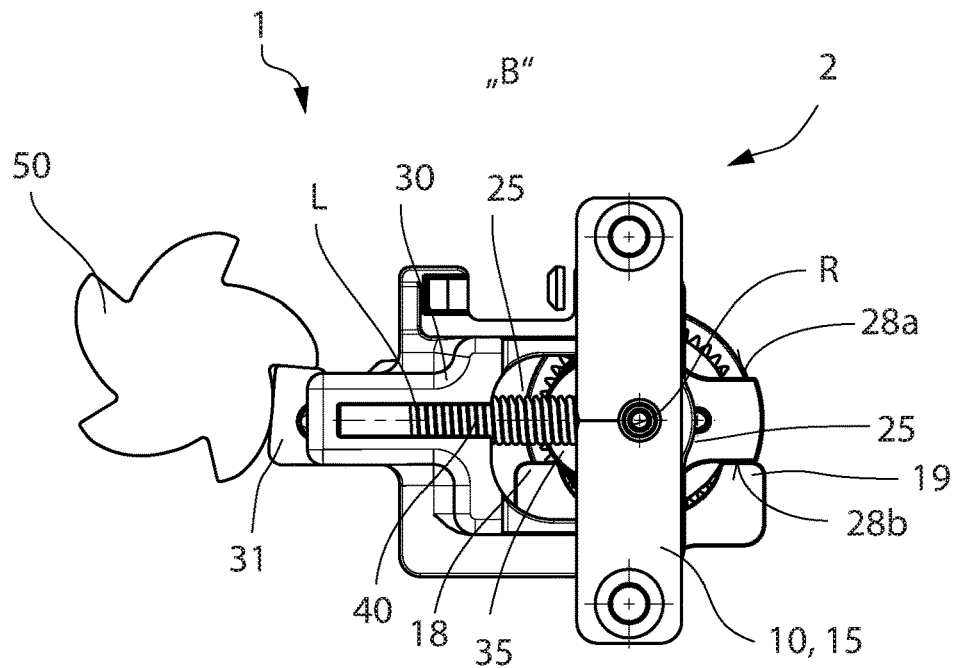
FIG. 4 shows the locking actuator according to FIGS. 1-3, wherein the ratchet slide is in the second position and the ratchet wheel is freely movable in both directions of rotation.
Figure 5:
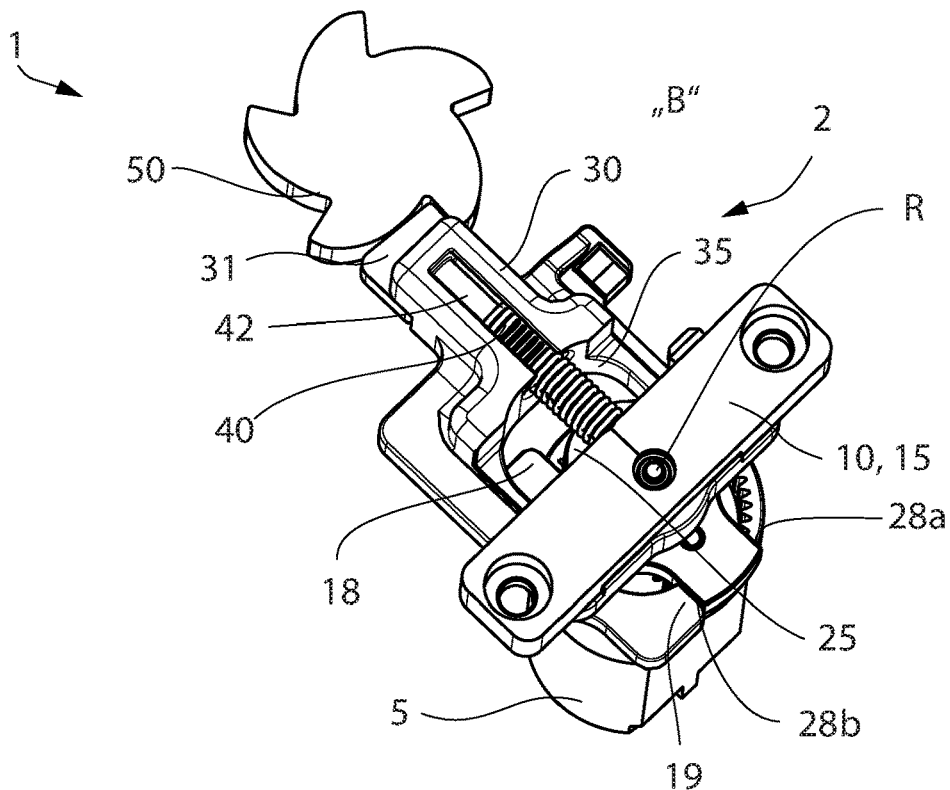
FIG. 5 shows a perspective representation of the locking actuator according to FIG. 4.

The housing 10 can—as indicated in FIG. 3—have a guide 12, by means of which the ratchet slide 30 is held movably in the axis L. Preferably, the guide 12 produces a form fit in which the ratchet slide 30 is held securely and which can absorb any transverse forces.

The ratchet slide 30 is supported on the housing 10 or the second housing part 15 so as to be biased by spring means 40, the spring means 40 being supported on the one hand on a spring shoe 42 in the ratchet slide 30 and on the other hand on the housing 10 or the second housing part 15. The spring means 40 bias the ratchet slide 30 in the axis L in the direction of the second position or in the direction of the ratchet wheel 50.

With reference to FIG. 1, it can be seen that the ratchet slide 30 has a guide recess 35. The guide recess 35 forms a contact surface on which the eccentric 25 can shift around the axis of rotation R during an orbital movement. A gate 36 is arranged in the guide recess 35, or in other words, the contact surface is designed as a gate 36 for the eccentric 25. The guide recess 35 can be larger than the eccentric 25, which is why the eccentric 25 is arranged in the guide recess 35 and movably within the guide recess 35. Preferably, the guide recess 35 is dimensioned in such a way that the eccentric 25 is movable in the axis L within the recess in the range of the order of magnitude of the locking path.

Spring means 40 bias the gate 36 against the eccentric 25, wherein the eccentric 25 predefines the deflection of the ratchet slide 30 in the direction of the second position or the ratchet wheel 50. The eccentric 25 glides with its lateral surface along the gate 36, wherein the gate 36 has a protrusion 37, which is shown in detail in particular in FIGS. 6 and 7.

The protrusion 37 is arranged on the side of the ratchet slide 30 facing the first end area in the guide recess 35 and protrudes into the guide recess 35 in the axis L. Next to the protrusion a final position section 38 of the gate 36 is provided, which the eccentric 25 enters in one of the final positions.

The protrusion 37 prevents undesired twisting of the eccentric 25 in the first final position "A" and/or the second final position "B", by first requiring the eccentric 25 to displace the ratchet slide 30 against the spring force of the spring means 40. This displacement can initially take place in the opposite direction. As a result, additional locking means can be dispensed with.

Figure 7:
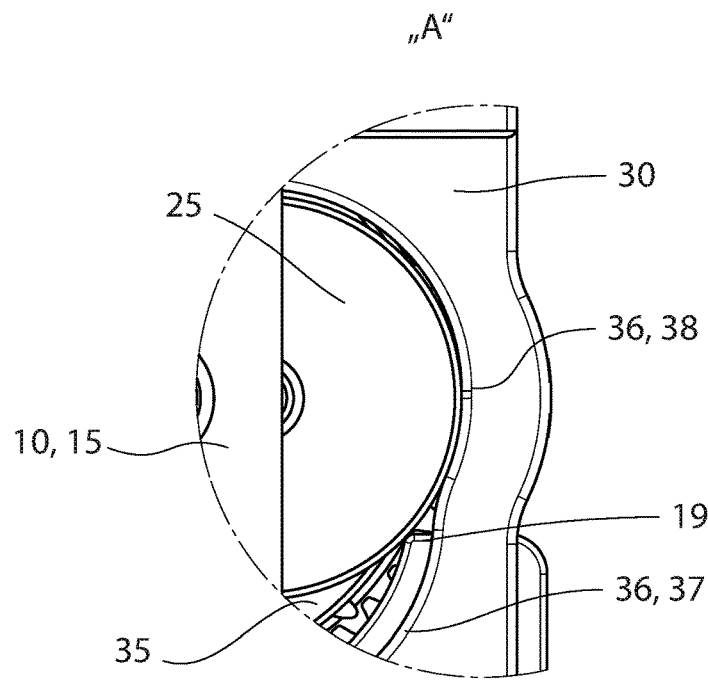
FIG. 7 shows an enlarged detailed representation of a gate of the ratchet slide.

In FIGS. 2, 3, and 7, the eccentric 25 is located in the first final position "A" and holds the ratchet slide 30 in a final position that releases the ratchet wheel 50. In this first position, the ratchet wheel 50 can be rotated freely in both directions of rotation. In the first final position "A", the stop surface 28a (not shown) is in operative contact with the first end stop 18 and the eccentric 25 is in operative contact with the final position section 38 of the gate 36.

In order to lock the brake transmission 1, the driving device 5 is controlled and the eccentric 25 is rotated by 180° in a clockwise direction in accordance with the arrow line shown in FIG. 2. The eccentric 25 is pushed along the gate 36 over the protrusion 37, whereby first the ratchet slide 30 is led away from the ratchet wheel 50 in the axis L and only then, as a result of a further rotation of the eccentric 25, is displaced in the direction of the ratchet wheel 50 by the spring force of the spring means 40 until the eccentric 25 has reached the second final position "B" according to FIGS. 4, 5 and 6.

In the second final position "B", the stop surface 28b comes into operative contact with the second stop 19 and the eccentric 25 enters or snaps into the final position section 38 of the gate 36. As a result of the engagement during the use of the locking actuator 2 for a brake transmission of a parking and/or service brake, the locking actuator 2 in the second position can safely hold the parking position even against un-wanted vibrations.

Figure 6:
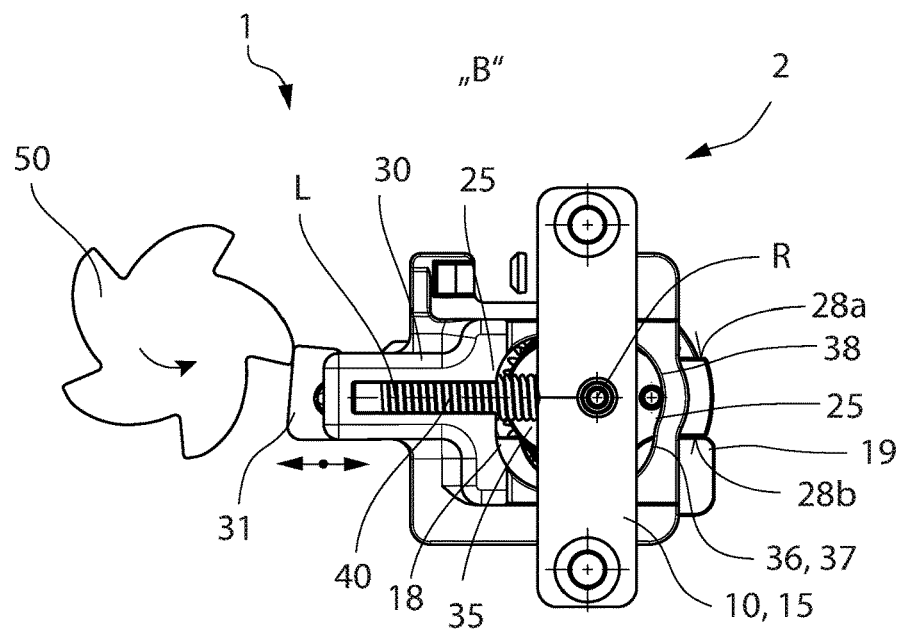
FIG. 6 shows the locking actuator according to FIGS. 1-5, wherein the ratchet slide meets a tooth of the ratchet wheel.

In the second final position "B", the ratchet wheel 50 is blocked—as indicated in FIG. 6 by means of an arrow line—and can only rotate in one of the two directions of rotation. In the case of a brake transmission 1 of a parking and/or service brake, this corresponds to the parking position. The ratchet slide 30 locks the ratchet wheel 50 in one direction of rotation and allows it to turn freely in the opposite direction of rotation. The ratchet slide 30 or the pawl 31 carry out an evasive movement against the spring force of the spring means 40. The parking and/or service brake can thus be tightened.

To release the brake transmission 1 or the ratchet wheel 50, the driving device 5 is controlled and the eccentric 25 is rotated by 180° against the arrow line shown in FIG. 2 until the stop surface 28a comes into operative contact with the first stop 18 and the eccentric 25 re-enters the final position section 38 of the gate 36. The reaching of the first final position "A" and/or the reaching of the second final position "B" can be detected by a sensor.

When locking the ratchet wheel, in exceptional cases it can happen that the ratchet slide 30 moves onto a tooth of the ratchet wheel, as shown for example in FIG. 6. The ratchet slide 30 or the pawl 31 are moved onto a projecting tooth of the ratchet wheel 50 and cannot lock the latter. A sensor of the brake transmission 1 can calculate the position or the engagement of the ratchet slide 30 or the pawl 31 and continue to rotate the ratchet wheel 50 by means of a brake motor, so that the pawl 31 can engage the ratchet wheel 50.

Figure 8:
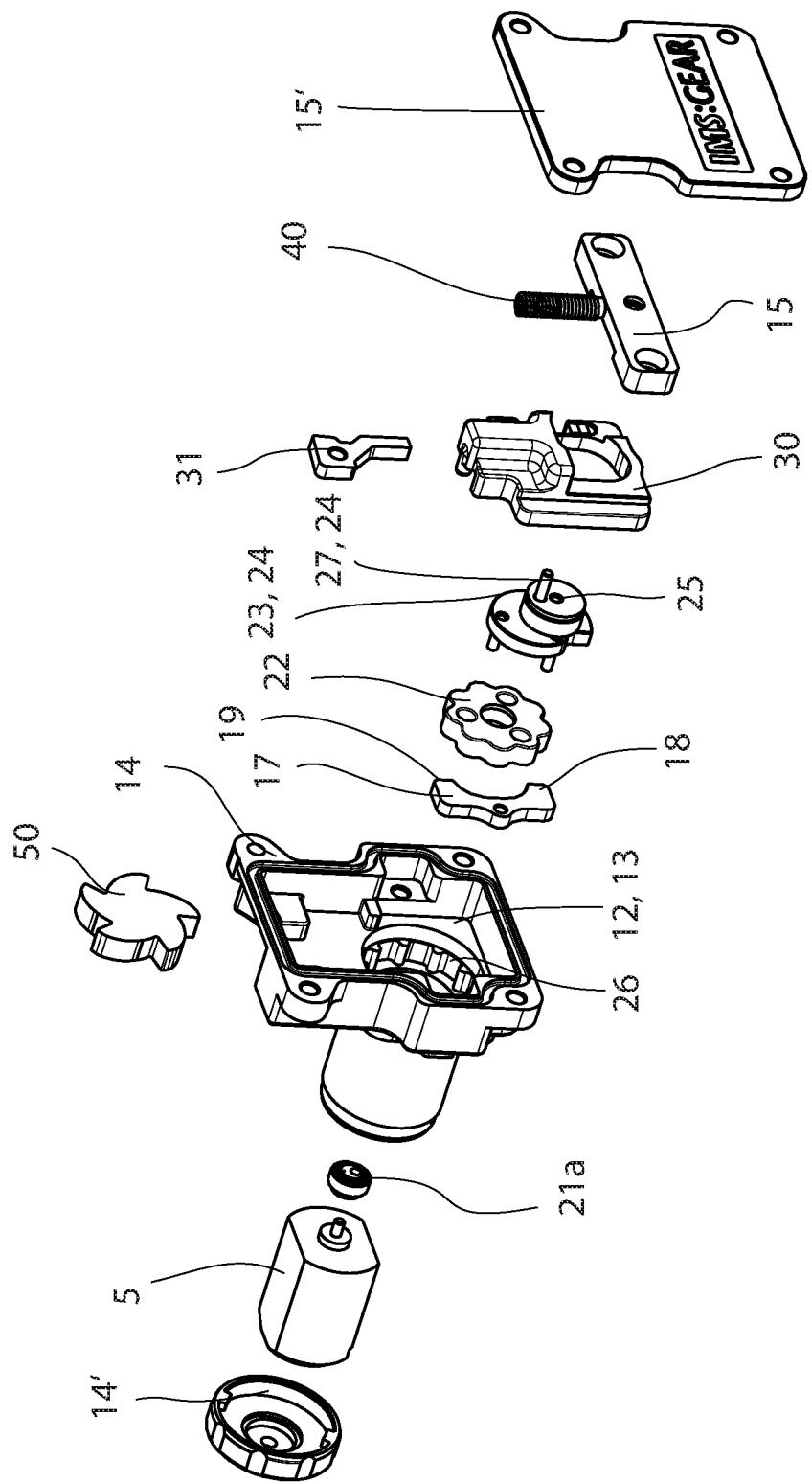
FIG. 8 is an exploded view of a locking actuator according to a second exemplary embodiment with a transmission designed as a cycloidal drive.

A second exemplary embodiment can be seen in FIG. 8, which is identical except for the design of the transmission 20.

According to the second exemplary embodiment, the transmission 20 is designed as a cycloidal drive. The drive gear 21 comprises an eccentric 21a, which is in operative contact with the planet gear 22. The planet gear 22 can roll along an orbit in the ring gear 26, wherein corresponding teeth of the ring gear 26 and of the planet gear mesh.

The carrier 23 is arranged so as to move around the axis of rotation R and has one or more pins, which reach into the recesses of the planet gear 22 and can transmit a rotational movement to the carrier. The carrier 23 is rotationally supported on the housing 10 by means of a shaft 27, preferably on the second housing part 15.

Analogously to the first exemplary embodiment, the eccentric 25 is arranged on the carrier 23 and is fixedly connected to it. As can be seen in detail in FIG. 9 the carrier 23 has no rotationally symmetrical shape about the axis of rotation R. The shape of the carrier 23 can be described as pear-shaped and includes an oval-shaped abdominal section and a cuboid-like neck section. The neck section forms the stop surface 28a, 28b in both rotational directions around the axis of rotation R, which surface can interact with the end stops 18, 19.

LIST OF REFERENCE NUMERALS

1 Brake transmission
2 Locking actuator
5 Driving device
10 Housing
12 Guide
13 Recess
14 Housing part
15 Housing part
18 End stop
19 End stop
20 Transmission
21 Drive gear
22 Planet gear
23 Carrier
25 Eccentric
26 Ring gear
27 Shaft
30 Ratchet slide
31 Pawl
35 Guide recess
36 Gate
37 Protrusion
38 Final position section
40 Spring means
42 Spring shoe
50 Ratchet wheel
L Axis
R Axis of rotation

The invention claimed is:

1. A locking actuator (2) for a brake transmission (1), comprising:
    a driving device (5);
    a housing (10);
    a transmission (20) with an axis of rotation (R) and an output; and
    a ratchet slide (30), which is movable in an axis (L) between a first position and a second position along a locking path,
    wherein the output is coupled to the ratchet slide (30) via an eccentric (25) and can move the ratchet slide (30) in the axis (L) when the output is rotated.

2. The locking actuator (2) according to claim 1, characterized in that the eccentric (25) engages a guide recess (35) of the ratchet slide (30).

3. The locking actuator (2) according to claim 2, characterized in that the eccentric (25) is movable within the guide recess (35) in a plane perpendicular to the axis of rotation (R) in the guide recess (35).

4. The locking actuator (2) according to claim 2, characterized in that the guide recess (35) in the axis (L) is dimensioned in such a way that a displacement of the eccentric within the guide recess (35) is enabled within the order of magnitude of the locking path.

5. The locking actuator (2) according to claim 2, characterized in that the guide recess (35) comprises a gate (36).

6. The locking actuator (2) according to claim 5, characterized in that the gate (36) has a protrusion (37), by means of which the ratchet slide (30) is initially moved in the opposite direction along the locking path between the first position and the second position.

7. The locking actuator (2) according to claim 1, characterized in that the ratchet slide (30) is biased into the second position by means of a spring means (40).

8. The locking actuator (2) according to claim 1, characterized in that the transmission (20) is a planetary gearset or a cycloidal drive, each with a ring gear (26).

9. The locking actuator (2) according to claim 8, characterized in that the transmission (20) has a drive gear (21) and at least one planet gear (22) which is coupled to the output via a carrier (23) that can be rotated about the axis of rotation (R).

10. The locking actuator (2) according to claim 9, characterized in that the ring gear (26) is fixed in the housing (10), and that the driving device (5) drives the drive gear (21).

11. The locking actuator (2) according to claim 1, characterized in that the output passes through the ratchet slide (30).

12. The locking actuator (2) according to claim 1, characterized in that the ratchet slide (30) is movably held by a guide (12) in the axis (L) perpendicular to the axis of rotation (R).

13. The locking actuator (2) according to claim 12, characterized in that the guide (12) of the ratchet slide (30) is formed by a recess (13) in the housing (10).

14. The locking actuator (2) according to claim 13, characterized in that the housing (10) has two housing parts (14, 15), which hold the ratchet slide (30) in the recess (13) in a form-fitting manner, and that the second housing part (15) holds the output in the axis of rotation (R).

15. The locking actuator (2) according to claim 1, characterized in that two end stops (18, 19) are provided, which restrict a rotation of the output or the eccentric (25) around the axis of rotation (R).

16. The locking actuator (2) according to claim 1, characterized in that a sensor is provided, which can detect the position of the ratchet slide (30), of the output and/or of the eccentric (25).

17. The locking actuator (2) according to claim 1, characterized in that the driving device (5) comprises a DC motor.

18. A brake transmission (1) with the locking actuator (2) according to claim 1, and a ratchet wheel (50), which can be rotated in a transmission axle.

19. A service and/or parking brake, in particular a service brake and/or parking brake of a motor vehicle, with the brake transmission (1) according to claim 18.

* * * * *